United States Patent
Belenkiy et al.

(10) Patent No.: US 9,015,489 B2
(45) Date of Patent: Apr. 21, 2015

(54) SECURING PASSWORDS AGAINST DICTIONARY ATTACKS

(75) Inventors: Mira Belenkiy, Redmond, WA (US);
Tolga Acar, Sammamish, WA (US);
Henry Nelson Jerez Morales,
Sammamish, WA (US); Alptekin Kupcu, Providence, RI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 704 days.

(21) Appl. No.: 12/755,426

(22) Filed: Apr. 7, 2010

(65) Prior Publication Data

US 2011/0252229 A1    Oct. 13, 2011

(51) Int. Cl.
| | |
|---|---|
| G06F 21/00 | (2013.01) |
| G06F 7/04 | (2006.01) |
| H04L 29/06 | (2006.01) |
| H04L 9/08 | (2006.01) |
| H04L 9/32 | (2006.01) |

(52) U.S. Cl.
CPC .............. *H04L 63/06* (2013.01); *H04L 9/0841* (2013.01); *H04L 9/3226* (2013.01); *H04L 9/3271* (2013.01); *H04L 63/083* (2013.01); *H04L 63/0853* (2013.01)

(58) Field of Classification Search
USPC .................................. 726/9, 20; 713/184, 185
See application file for complete search history.

(56) References Cited

U.S. PATENT DOCUMENTS

| | | | |
|---|---|---|---|
| 5,918,228 A | 6/1999 | Rich et al. | |
| 6,829,356 B1 | 12/2004 | Ford | |
| 6,938,158 B2 | 8/2005 | Azuma | |
| 6,957,337 B1 | 10/2005 | Chainer et al. | |
| 7,178,031 B1 | 2/2007 | Seger | |

(Continued)

FOREIGN PATENT DOCUMENTS

WO     WO 2007008540 A2 *  1/2007

OTHER PUBLICATIONS

Libert, et al., "Forward-Secure Signatures in Untrusted Update Environments: Efficient and Generic Constructions", Retrieved at << http://www.dice.ucl.ac.be/~libert/FS-untrusted-ccs.pdf >>, Proceedings of the 14th ACM conference on Computer and communications security, Oct. 29, 2007, pp. 1-10.

(Continued)

*Primary Examiner* — Dede Zecher
*Assistant Examiner* — Abdullah Almamun
(74) *Attorney, Agent, or Firm* — Julie Kane Akhter; Danielle Johnston-Holmes; Micky Minhas

(57) ABSTRACT

Described herein are various technologies pertaining to constructions of a password-based authentication protocol that are configured to allow a user to register with and authenticate to an online service without the online service receiving a password or a deterministic function of the password of the user. When registering with an online service, a client computing device establishes a cryptographically strong random secret and stores an encryption of such secret with a data storage device. The storage device also never receives the password or a deterministic function of the password. When the user wishes to authenticate to the online service, the user employs her password to retrieve the encrypted secret from the storage device, decrypts such secret, and utilizes the decrypted secret to answer a cryptographically strong challenge provided to the user by the online service upon the online service receiving a username pertaining to such user.

20 Claims, 11 Drawing Sheets

(56) References Cited

U.S. PATENT DOCUMENTS

| | | | |
|---|---|---|---|
| 7,246,230 B2 | 7/2007 | Stanko | |
| 7,783,893 B2* | 8/2010 | Gorelik et al. | 713/186 |
| 8,381,272 B1* | 2/2013 | Nelson et al. | 726/5 |
| 8,411,854 B2* | 4/2013 | Grzonkowski et al. | 380/29 |
| 8,738,908 B2* | 5/2014 | Lee | 713/168 |
| 2002/0026581 A1* | 2/2002 | Matsuyama et al. | 713/168 |
| 2002/0067832 A1* | 6/2002 | Jablon | 380/277 |
| 2002/0129247 A1* | 9/2002 | Jablon | 713/169 |
| 2004/0030932 A1 | 2/2004 | Juels et al. | |
| 2007/0050618 A1* | 3/2007 | Roux et al. | 713/155 |
| 2007/0156829 A1* | 7/2007 | Deboy et al. | 709/206 |
| 2008/0052343 A1 | 2/2008 | Wood | |
| 2010/0199089 A1* | 8/2010 | Vysogorets et al. | 713/168 |
| 2010/0325428 A1* | 12/2010 | Satoh | 713/156 |
| 2011/0093941 A1* | 4/2011 | Liu et al. | 726/7 |
| 2011/0302627 A1* | 12/2011 | Blom et al. | 726/2 |
| 2012/0185697 A1* | 7/2012 | Buer | 713/185 |

OTHER PUBLICATIONS

Yoon, et al., "Improving the Generalized Password-based Authenticated Key Agreement Protocol", Retrieved at << http://ieeexplore.ieee.org/stamp/stamp.jsp?arnumber=04539371 >>, The 3rd International Conference on Grid and Pervasive Computing—Workshops, May 25, 2008, pp. 341-346.

Wiedenbeck, et al., "Authentication Using Graphical Passwords: Effects of Tolerance and Image Choice", Retrieved at << http://www2.tech.purdue.edu/Cgt/courses/cgt512/discussion/Mehra-wiedenbeck_discussion_Article%5B1%5D.pdf >>, Proceedings of the 2005 symposium on Usable privacy and security, Jul. 8, 2005, pp. 1-12.

Boyen, Xavier, "Hidden Credential Retrieval from a Reusable Password", Retrieved at << http://ai.stanford.edu/~xb/asiaccs09/hcr.pdf>>, Proceedings of the 4th International Symposium on Information, Computer, and Communications Security, Mar. 10-12, 2009, pp. 1-20.

Ogata, et al., "Oblivious Keyword Search", Retrieved at <<http://eprint.iacr.org/2002/182.pdf >>, Journal of Complexity, Special issue on coding and cryptography, vol. 20 , No. 2-3, Apr./Jun. 2004, pp. 1-20.

\* cited by examiner

SECURING PASSWORDS AGAINST DICTIONARY ATTACKS

BACKGROUND

Many different online services allow users to authenticate with such services through utilization of a username and password. Example online services include banking services, online news companies, email services, instant messaging services, social networking services, amongst many other online services. Generally, passwords are chosen such that the user can easily remember these passwords. Oftentimes, a password chosen by a user will be made up of a single, commonly used word or combination of words. These passwords can be categorized as "weak", as a malicious hacker may undertake a dictionary attack and learn the password of the user. A dictionary attack refers to an attempt to learn a password by attempting words or combinations of words that are found in a dictionary. Some security mechanisms are currently utilized to prevent online dictionary attacks, such as limiting the number of login attempts over a particular amount of time with respect to a certain username. There is, however, currently no conventional mechanism for preventing offline attacks, wherein an online service provider or a third party attacker can attempt to execute a dictionary attack with respect to a password of a user when the user is not attempting to log into the online service.

Additionally, individuals tend to have many different accounts with various different online services. Oftentimes, users will utilize the same password across many different accounts. Thus, if a password for a first account (such as a newspaper account) is determined by a malicious hacker, such hacker may attempt to log into an online service pertaining to a banking account of the user by using the same password. In an example attack, a malicious hacker may set up an online service that is configured to receive a username and password of a particular user. Once the online service receives such password, the malicious hacker can utilize the password to log into other online services of the user.

One manner for protecting passwords or mitigating dictionary attacks is for a user to employ "strong" passwords, which are a mixture of numbers, letters and symbols that are relatively long in length. Furthermore, ideally, a user should utilize a different password for each service, such that if one password is compromised, accounts with other online services of the user are not compromised. In actuality, however, users do not choose strong passwords, and users do not utilize a variety of passwords across accounts. This is because users feel that they are unable to remember strong passwords, much less numerous strong passwords for different accounts.

SUMMARY

The following is a brief summary of subject matter that is described in greater detail herein. This summary is not intended to be limiting as to the scope of the claims.

Described herein are various technologies pertaining to constructions of a password-based authentication protocol that are configured to allow a user to register with and authenticate to an online service without the online service receiving a password from the user. The constructions described herein do not require alteration of the user experience when a user is registering with or authenticating to an online service. Furthermore, in the constructions described herein, authenticating with an online service is not limited to one-time passwords, and a user need not employ a hardware token to generate one-time use passwords.

The constructions described herein utilize a data storage device which can be remotely accessed by way of a network. Alternatively, the data storage device can be a local storage device trusted while executing the registration and authentication protocols, such as a mobile telephone, a mobile media player, etc. The constructions described herein can be configured such that if the local storage device is no longer under the control of the user, the contents may be revealed to third parties without compromising a persistent password of the user. Additionally, the constructions described herein do not cause a remotely accessible storage device to retain data that can be utilized by such storage device to learn the persistent password of the user. The constructions described herein utilize various cryptographic algorithms/functions during user registration with an online service, as well as during user authentication to such online service.

Generally, when registering with a service, a client computing device employed by a user wishing to register with the online service establishes a cryptographically strong random secret and stores an encryption of such secret in the aforementioned storage device. This encrypted secret cannot be retrieved/decrypted by anyone who does not have knowledge of the password of the user. When the user wishes to authenticate to the online service, the user employs his or her password to retrieve the encrypted secret from the storage device, decrypts such secret, and utilizes the decrypted secret to answer a cryptographically strong challenge provided to the user by the online service upon the online service receiving a username pertaining to such user.

Various different constructions of a protocol that can be utilized to mitigate dictionary attacks against user passwords are described herein. A first set of constructions pertains to when a user is employing a trusted client computing device such as a computing device located in a home of the user. This scenario can also be extended to a trusted mobile device. In this case the mobile device can be considered another instance of the trusted client computing device. In the first set of constructions, an online data store can be utilized to store cryptographically secure secret data which can be utilized to authenticate to an online service responsive to receipt of an authentication challenge from the online service. A second set of constructions pertains to when the user is employing a trusted computer when registering with an online service and employing an untrusted computer when authenticating to an online service, such as a shared computing device in an Internet lobby, a public library, etc. In such a construction, the user can employ a trusted mobile storage device such as a mobile phone to perform cryptographic functions and generate secret data that can be utilized to authenticate to an online service without providing the online service with the password of the user or an encrypted version thereof.

Other aspects will be appreciated upon reading and understanding the attached figures and description.

DETAILED DESCRIPTION

Figure 1:
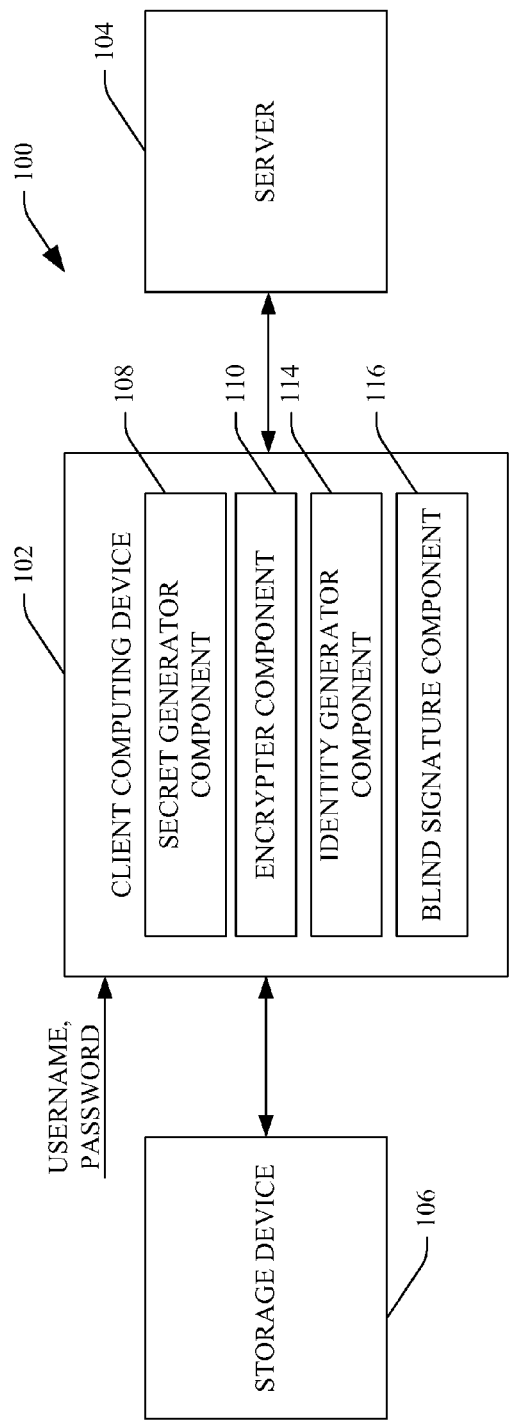
FIG. 1 is a functional block diagram of an example system that facilitates mitigating dictionary attacks against a password of an individual.

Various technologies pertaining to mitigating dictionary attacks against a password of an individual will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a single component may be configured to perform functionality that is described as being carried out by multiple components.

Additionally, various example methodologies are illustrated and described herein. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

With reference to FIG. 1, an example system 100 that facilitates registering a user with an online service in a manner that protects a password of the user from dictionary attacks is illustrated. The system 100 comprises a client computing device 102 that can be employed by a user. For instance, the client computing device 102 may be a computing device that is trusted by the user. Specifically, the client computing device may be owned by the user, owned by a family member of the user, etc. The system 100 can further comprise a server 104 that can be in communication with the client computing device 102 by way of any suitable network connection. The server 104 can host an online service with which the user of the client computing device 102 desires to register. The online service may be, but is not limited to being, an online banking service, an online email service, an online news service, an online social networking service, an online instant messaging service, or any other type of service that requires a user to create an account with the service (that may be identified by a username) and to later prove to the service that the user is the owner of the account.

The system 100 further comprises a computer storage device 106 that can be in communication with the client computing device 102 by way of any suitable (secure) connection. Pursuant to an example, the storage device 106 may be provided by an online data storage service that is configured to facilitate registering and authenticating with online services while mitigating dictionary attacks against passwords of users. In another example, the storage device 106 may be a storage device that is local to the client computing device 102. The storage device 106 may be an external hard drive coupled to the client computing device 102, a flash memory drive coupled to the client computing device 102, etc. In still yet another example, the storage device 106 may be comprised of a mobile computing device such as a mobile telephone, a portable media player and/or the like. In this case, the mobile computing device can have some form of protection, such as pin protection or some form of encrypted storage. Thus, the storage device 106 may be a trusted storage device that is in the possession of the user. It is to be understood, however, that constructions described herein that utilize a local storage device (a mobile telephone, etc.) in connection with registering with/authenticating to an online service can be configured in such a manner that even if the user loses possession of the local computing device and contents are available to a malicious third party, such third party would be unable to learn the persistent password of the user.

The user of the client computing device 102 may desire to register with the online service hosted by the server 104. Pursuant to an example, the user of the client computing device 102 can cause a browser executing on such client computing device 102 to be directed to a URL that corresponds to the online service. During the registration process, the online service requests that the user provide the online service with a username, such as an email address or other suitable username, and a password. Therefore, for instance, text entry fields can be presented on a web page corresponding to the online service that are configured to receive a username and password that can be utilized by the user to register with the online service and authenticate such user to the online service at a later point in time.

As will be described in greater detail herein, a password provided by the user or a deterministic function thereof is not transmitted to the server 104. If the storage device is a network device, then the password or a deterministic function thereof is not transmitted/revealed to the storage device. If the storage device is a trusted local storage device, then the password or a deterministic function thereof is not stored on the storage device beyond the time it takes to execute an instance of the registration or authentication protocol. The client computing device 102 may comprise a secret generator component 108. The secret generator component 108 is configured to generate some strong random or pseudo-random secret data upon receiving an indication from the user that the user wishes to register with the online service hosted by the server 104. Therefore, the secret generator component 108 can generate strong random or pseudo-random secret data upon receiving a username, a password, and possibly other information such as the name of the online service (e.g., a URL) during the user registration process. In an example, such strong random or pseudo-random secret data may be or include keys to a signature scheme, such as an asymmetric signature scheme such as RSA, or a symmetric signature scheme such as HMAC, and/or keys to a deterministic blind signature scheme. The client computing device 102 may then provide the server 104 with such secret data generated by the secret generator component 108 and a username of the user. Accordingly, the server 104 does not receive the password of the user or a deterministic function thereof.

The client computing device 102 further comprises an encrypter component 110 that performs an encryption on the secret data generated by the random secret generator component 108, wherein such encryption can be based at least in part upon the password of the user. The output of the encrypter component 110 can be an encryption of secret data output by the secret generator component 108, which can be transmitted to the storage device 106.

The client computing device 102 further comprises an identity generator component 114 that is configured to generate an identity of the user that can be utilized in connection with indexing the data output by the encrypter component 110 at the storage device 106. For example, such identity may be indicative of the user as well as the online service with which the user has registered. As will be described below, the identity generator component 114 can be configured to generate an identity that would render it difficult for someone to determine the identity of the user and the online service with which the user is registered. Alternatively, this data can be transmitted to the storage device 106 in the clear by the client computing device 102.

The client computing device 102 may optionally include a blind signature component 116 that takes as input a blind signature signing key and a message and outputs a blind signature on the message. The blind signature component 116 can be used to sign a hash of the password. In an example, the blind signature can be used as either an encryption key or as an identity of the user.

In summary, during registration with an online service hosted by the server 104, the client computing device 102 can be configured to establish a cryptographically strong random secret and can cause an encryption of this secret to be retained with the data store. This encrypted secret cannot be retrieved or decrypted by anyone who does have knowledge of the password of the user. Furthermore, offline dictionary attacks by either the server 104 or storage device 106 are ineffective against such scheme (as long as the server 104 and storage device 106 don't collude) due to the utilization of the storage device 106 and the encryption techniques described herein.

Figure 2:
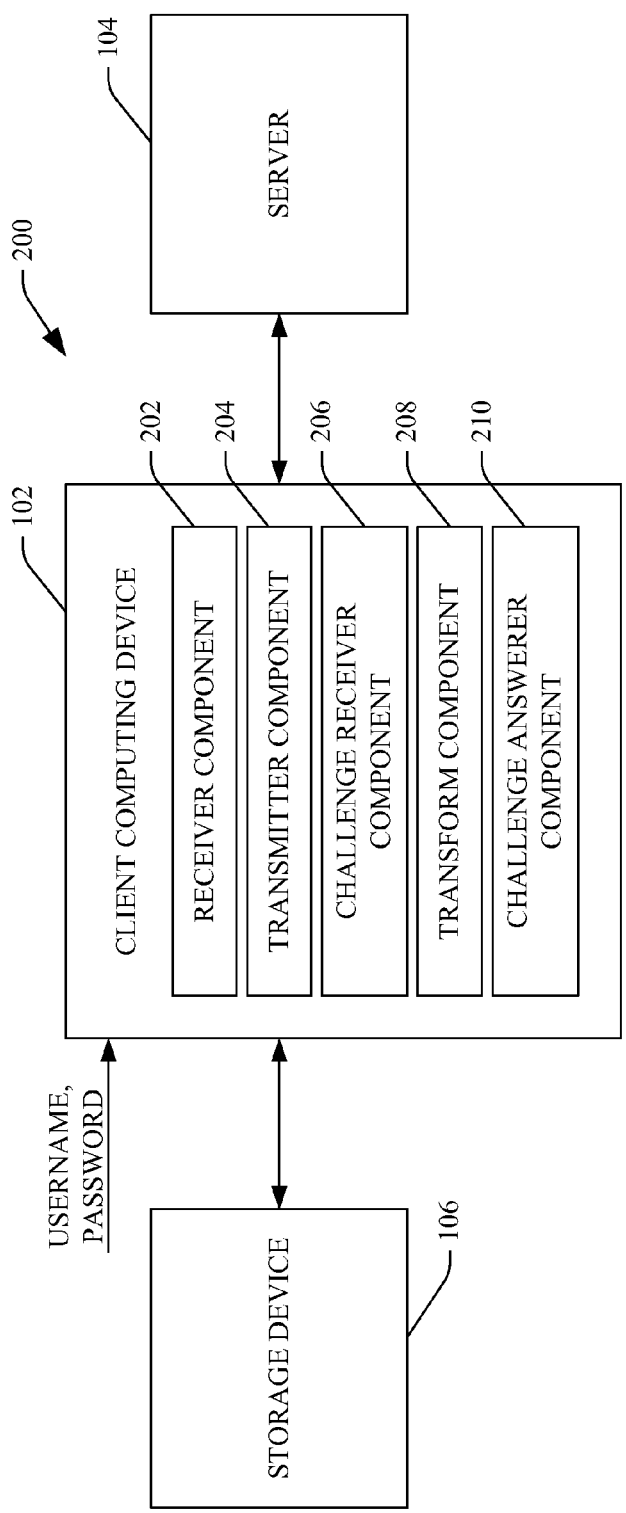
FIG. 2 is a functional block diagram of an example system that facilitates authenticating to an online service without providing the online service and/or storage device with a password of a user.

Referring now to FIG. 2, an example system 200 that facilitates authenticating to the online service without providing the online service with the password of the user or a deterministic function thereof is illustrated. The system 200 comprises the client computing device 102, the server 104, and the storage device 106, which can be in communication as described above. In this example, the client computing device 102 comprises a receiver component 202 that receives an indication that the user wishes to authenticate with the online service hosted by the server 104. For instance, this indication may include the user directing a browser to a web site corresponding to the online service and entering a username and password in text fields of a web page loaded by the browser. A transmitter component 204 can transmit the username to the server 104, such that the online service can identify who wishes to authenticate with such service. Responsive to receipt of the username, the server 104 can output a cryptographically strong challenge and provide such challenge to the client computing device 102.

A challenge receiver component 206 in the client computing device 102 can receive such challenge from the server 104. Pursuant to an example, such a cryptographically strong challenge can request a cryptographic signature from the client computing device 102. The client computing device 102 may further comprise a transform component 208 that can execute a cryptographic function on the password received from the user to retrieve and decrypt the encrypted strong secret data from the storage device 106. The transform component 208 can execute the first cryptographic function responsive to receipt of the challenge from the server 104.

The client computing device 102 may also include a challenge answerer component 210 that executes a second cryptographic function on the data retrieved from the storage device 106 to generate a signature. This generated signature can be secure against dictionary attacks, as the signature is not the password or a deterministic function of the password. The transmitter component 204 may then be configured to transmit the signature to the server 104 to answer the challenge presented by such server 104.

Figure 3:
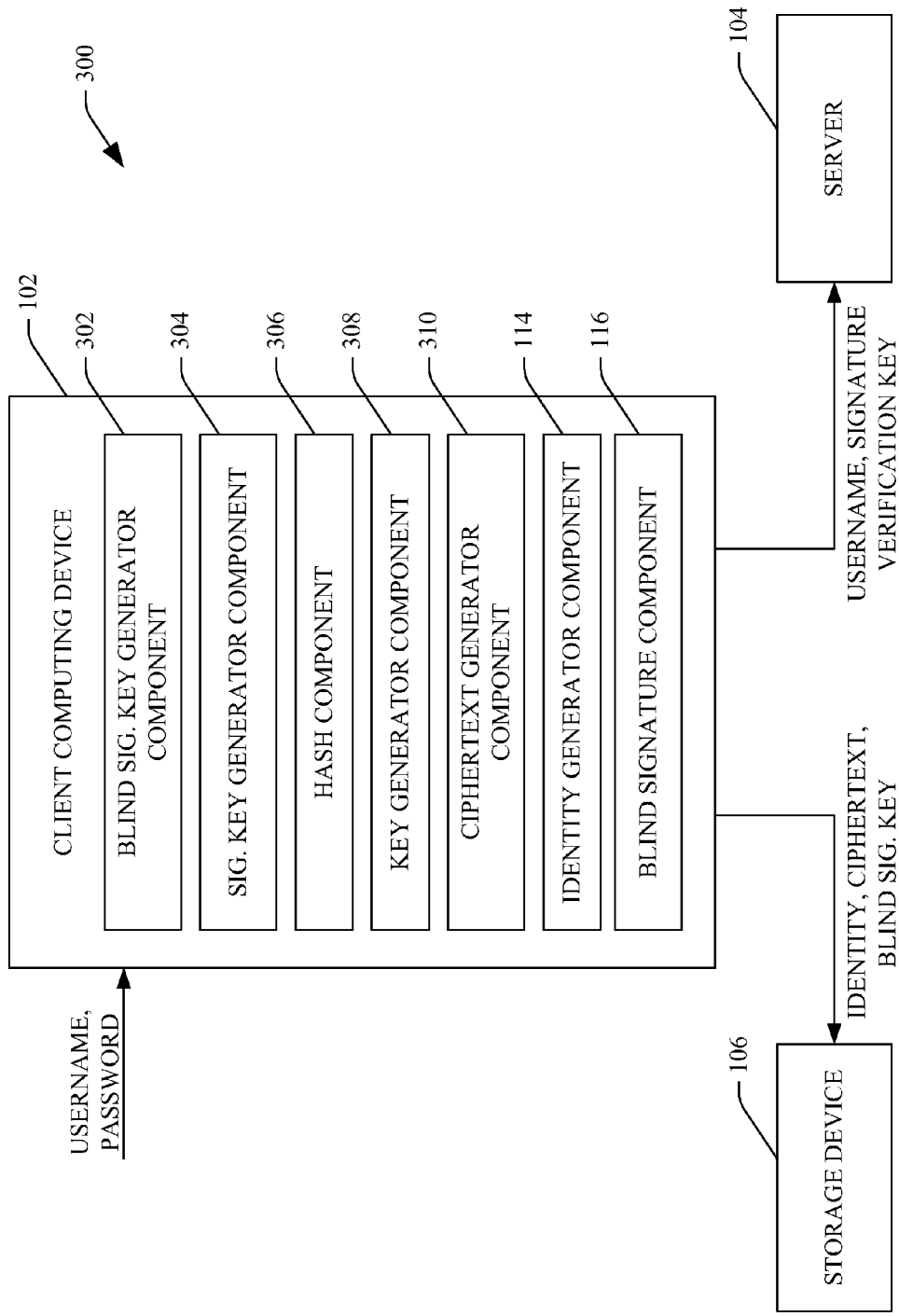
FIG. 3 is a functional block diagram of an example system that facilitates implementing a protocol during registration to an online service in a way that protects a password of a user against a dictionary attack by either the online service or a storage device.

As will be described in detail below, various constructions of a protocol can facilitate protecting a password of a user from dictionary attacks. These constructions include acts undertaken by a client computing device, a server, and a storage device for both a registration phase and an authentication phase. FIG. 3 pertains to a registration phase of a first construction, FIG. 4 pertains to an authentication phase of the first construction, FIG. 5 pertains to a registration phase of second and third constructions, FIGS. 6 and 7 pertain to an authentication phase of the second and third constructions, respectively, FIG. 8 pertains to a registration phase of fourth and fifth constructions, and FIGS. 9 and 10 pertain to an authentication phase of the fourth and fifth constructions, respectively.

Referring now solely to FIG. 3, an example system 300 that illustrates interaction of a client computing device, a server, and a storage device in the first construction of a protocol that facilitates mitigating dictionary attacks against a password of a user is illustrated. The system 300 comprises the client computing device 102, the server 104, and the storage device 106. In this first construction, a user of the client computing device wishes to register with an online service hosted by the server 104. Accordingly, the user wishes to provide the server 104 with some information that can be utilized to identify the user via the client computing device 102. Furthermore, in this example first construction, the user views the client computing device 102 as a trusted terminal. That is, the user trusts the programs that are executing on the client computing device 102. For instance, the user may own such client computing device 102.

To initiate registration, the user can establish a secure communication channel between the client computing device 102 and the server 104 by, for example, directing a browser executing on the client computing device 102 to the server 104 by way of an HTTPS connection. Furthermore, when the user initiates communication with the online service hosted by the server 104, a communication channel between the client computing device 102 and the storage device 106 can be established, wherein such communication channel may be a secure communication channel such as an HTTPS connection.

Once the user has directed the browser to a web page corresponding to the online service hosted by the server 104, the user can place a username that identifies the user and a persistent password into text entry fields on such web page. It is to be understood that the password is not transmitted to the server 104 or the storage device 106. The client computing device 102 can comprise a blind signature key generator component 302, which can generate a blind signature key pair, wherein such key pair may include a blind signature key (bsk) and a blind verification key (bvk). These blind signature keys can be keys to a deterministic blind signature scheme. The client computing device 102 also comprises a signature key generator component 304 that can generate keys to a regular signature scheme, which can be an asymmetric signature scheme such as RSA or a symmetric signature scheme such as HMAC. Therefore, the signature key generator component 304 may be configured to generate a key pair, wherein the key pair includes a signing key (ssk) and a signature verification key (svk). The client computing device 102 may then be configured to transmit the username provided by the user and the svk generated by the signature key generator component 304 to the server 104 that hosts the online service. It can be ascertained that the server 104 does not receive the password of the user or a deterministic function thereof, but rather receives a randomly generated (or pseudo-randomly generated) svk. While not shown, it is to be understood that the secret generator component 108 can comprise the blind signature key generator component 302 and the signature key generator component 304.

The client computing device 102 further comprises a hash component 306 that is configured to execute a cryptographically secure hash function over the password of the user.

The client computing device 102 further comprises the blind signature component 116 that is configured to compute a blind signature (bsig) on the hash of the password of the user.

A key generator component 308 can be configured to receive the blind signature bsig computed by the blind signature component 116, use the hash component 306 to compute the hash of the blind signature, and output this hash as an encryption key. The key generator component may also output bsig as the encryption key directly. A ciphertext generator component 310 can utilize the encryption key output by the key generator component 308 to encrypt the ssk output by the signature key generator component 304. The resulting encrypted ssk output by the ciphertext generator component 310 can be referred to herein as ciphertext. The encrypter component 110 shown in FIG. 1 can comprise the hash component 306, the key generator component 308, and the ciphertext generator component 310.

The client computing device 102 may also comprise the identity generator component 114 that can be configured to output an identity of the user of the client computing device 102 that can identify the user and the online service hosted by the server 104. For example, the identity generator component 114 can generate a deterministic function of the username provided by the user and the name of the online service with which the user wishes to register. For instance, the identity generator component 114 can be configured to generate a hash of the combination of the username and the name of the service, and transmit such hash as the identity. The client computing device 102 may then be configured to transmit the identity, the ciphertext, and the bsk to the storage device 106 for retention thereon, such that the ciphertext and bsk are indexed in the storage device 106 by the identity. Furthermore, the client computing device 102 can be configured to delete all data pertaining to the registration with the online service, and the user need not remember anything but the username and persistent password. Thus the client computing device does not retain the ssk, the svk, the bsk, the bvk, the bsig, the hash of bsig, the identity, or the hash of the password.

Furthermore, it can be ascertained that the storage device 106 is not able to perform a dictionary attack to learn the password of the user, as the storage device 106 retains the ciphertext and the blind signature key but does not obtain the bsig, which is the deterministic blind signature on the password nor the signature key ssk; thus the storage device 106 never learns the password or a deterministic function of the password. Thus, if the storage device 106 were attempting a dictionary attack, the storage device 106 would never know if a guessed password is the persistent password of the user, as the storage device 106 does not have access to enough information to verify the password.

Figure 4:
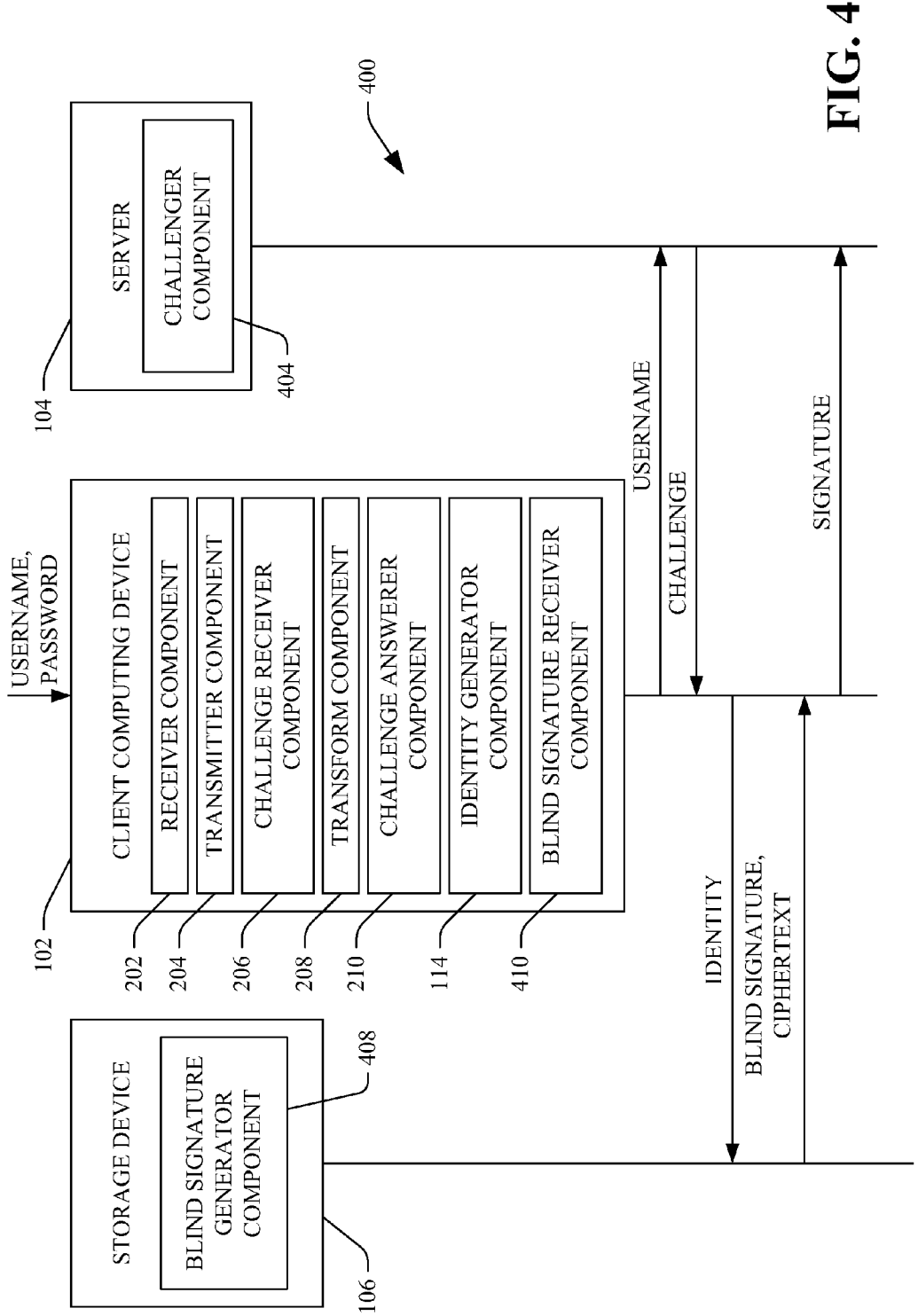
FIG. 4 is a diagram that illustrates interaction of a storage device, a client computing device and a server during an example authentication of a user to an online service.

With reference now to FIG. 4, an example diagram 400 illustrating interaction between the client computing device 102, the server 104, and the storage device 106 during an authentication phase corresponding to the first construction of the protocol is illustrated. In this example construction, a user of the client computing device 102 establishes a secure connection between the client computing device 102 and the server 104 that hosts the online service with which the user wishes to authenticate, and provides the client computing device 102 with the username and password established provided by the user in the above-described registration phase.

Specifically, the user can initiate a secure connection between the client computing device 102 and the server 104 through utilization of a browser, and can provide the username and password to text entry fields in a web page corresponding to the browser. The receiver component 202 can receive the username and password, and the transmitter component 204 can cause the username to be transmitted to the server 104. The server 104 can include a challenger component 404 that initiates a cryptographically strong challenge, and transmits such challenge to the client computing device 102. To respond to the challenge generated by the challenger component 404, the client computing device 102 must return a valid signature on the challenge, which the challenger component 404 will check using the svk the client computing device 102 transferred to the server 104 during registration.

To obtain the svk, the client computing device 102 retrieves the data transmitted to the storage device 106 during registration. In detail, the identity generator component 114 can generate the identity as described above, and can access contents of the storage device 106 that are indexed by the identity. That is, the client computing device 102 can transmit the identity to the storage device 106, and the storage device 106 can access the bsk and ciphertext indexed by the identity.

The client computing device further comprises the transform component 208, which can receive the password of the user and create a hash of such password (e.g., the transform component 208 may utilize the same hashing function as the hash component 306 of FIG. 3). The storage device 106 comprises a blind signature generator component 408, and the blind signature generator component 408 and a blind signature receiver component 410 on the client computing device 102 can interact to generate a blind signature on the hash of the password. In more detail, the blind signature generate component 408 can execute a multi-step interactive protocol with the blind signature receiver component 410 on the computing device 102 to generate the blind signature of the hash of the password. As will be understood by one of ordinary skill in the art, the password and/or the hash of the password is not revealed to the storage device 106, due to the properties of blind signatures. Therefore, upon receipt of the identity from the client computing device 102, the storage device 106 is configured to perform a blind signature on the hash of the password, and to provide the client computing device 102 with the blind signature and the ciphertext which have been described above. In this example, the transform component 208 can be configured to obtain a blind signature on the hash of such password.

The challenge answerer component 210 can receive the ciphertext and the blind signature on the hash of the password, and can utilize the hash of the blind signature to decrypt the ciphertext and retrieve the ssk that is needed to answer the challenge proffered by the challenger component 404 on the server 104. The challenge answerer component 210 can utilize the ssk to generate a signature to answer the challenge proffered by the challenger component 404, and the transmitter component 204 can transmit such signature to the server 104. The challenger component 404 may then utilize this signature to authenticate the user, thereby providing the user with access to the online service hosted by the server 104.

It is to be understood that the example first construction of the protocol described with respect to FIGS. 3 and 4 does not reveal a persistent password of the user or a deterministic function of the password of the user to the server 104 or the storage device 106 as long as the server 104 and storage device 106 do not collude. Additionally, the first construction of the protocol does not require any synchronized calendars of clocks between the storage device 106, the client computing device 102, and/or the server 104.

Figure 5:
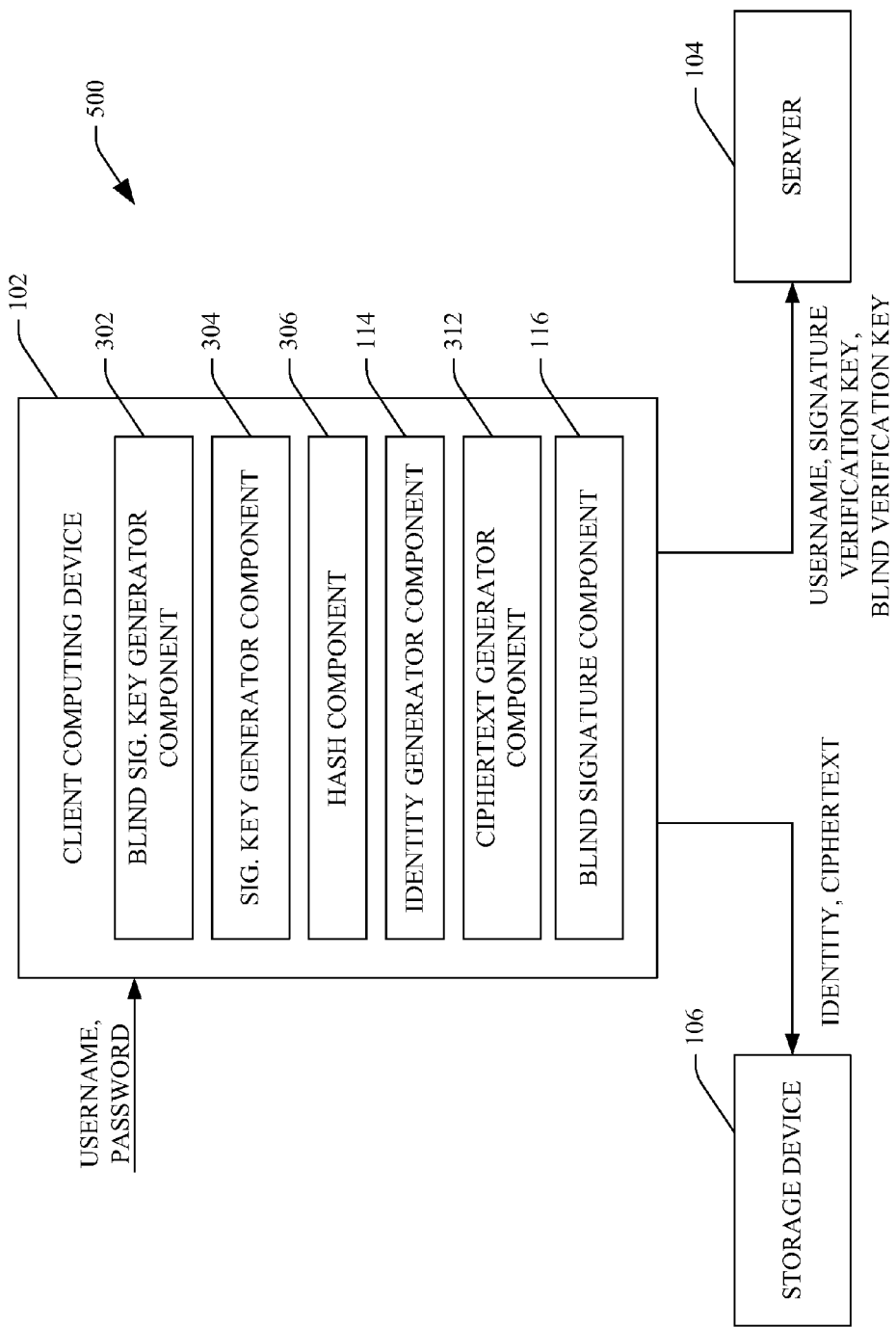
FIG. 5 is a functional block diagram of an example system that facilitates implementing a protocol during registration to an online service in a way that protects a password of a user against a dictionary attack by either the online service or a storage device.

Referring now to FIG. 5, an example system 500 that illustrates interaction of a client computing device, a server, and a storage device during a registration phase in the second and third constructions of a protocol that facilitates mitigating dictionary attacks against a password of a user is illustrated. The system 500 comprises the client computing device 102, the server 104, and the storage device 106. The client computing device 102 receives the username and password from a user who wishes to register with the online service hosted by the server 104. As described above, this can be undertaken by utilization of any suitable secure connection between the client computing device 102 and the server 104, such as an HTTPS connection and utilization of a browser. The blind signature key generator component 302 can be configured to generate keys to a deterministic blind signature scheme (bsk and bvk). The signature generator component 304 can be configured to generate a set of signing keys to a regular signature scheme (ssk and svk).

The hash component 306 can be configured to generate a hash of the password of the user, wherein the hashing function is a cryptographically strong hashing function. The identity generator component 114 can be configured to generate an identity that is more cryptographically secure than simply outputting the username to the storage device 106 and/or a deterministic combination of the username and name of the online service. In an example, the identity generator component 114 can use the blind signature component 116 to compute an identity as a blind signature on the hash of the password using the blind signature key bsk. In another example, the identity generator component 114 can generate an identity as a blind signature of the password itself using the blind signature key bsk. The ciphertext generator component 310 can utilize the hash of the password output by the hash component 306 to generate ciphertext. Specifically, the ciphertext generator component 310 can encrypt the signature key ssk using the hash of the password as the encrypting key.

The client computing device 102 may then be configured to transmit the identity generated by the identity generator component 312 and the ciphertext output by the ciphertext generator component 310 to the storage device 106. Additionally, the client computing device 102 can be configured to transmit the username, the svk and the bvk to the server 104. The client computing device 102 may then delete all data generated by the components 302-312 from the client computing device 102, and the user need only remember the username and persistent password to authenticate to the server 104. Furthermore, neither the server 104 nor the storage device 106 has the password of the user or a deterministic function of thereof.

Figure 6:
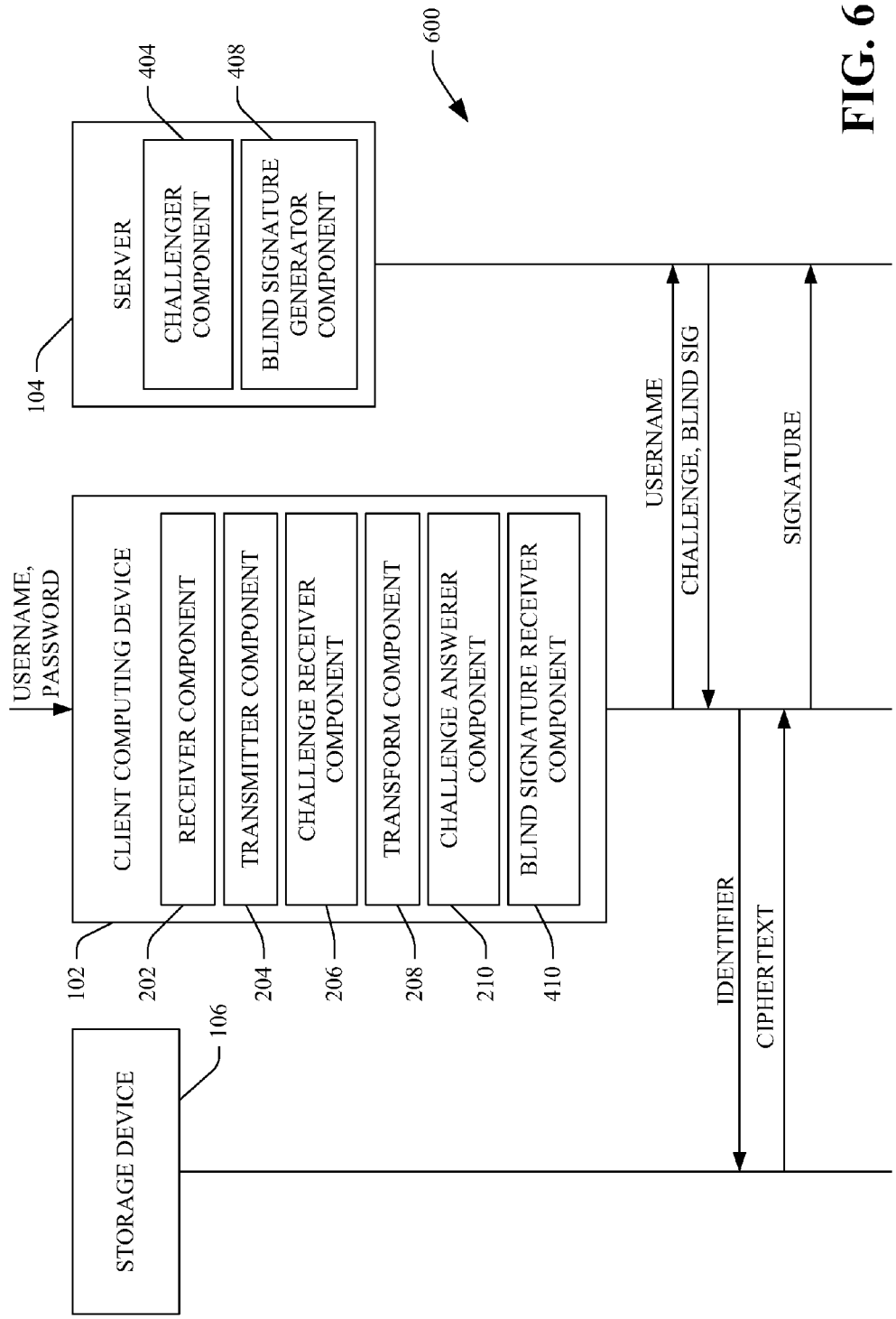
FIG. 6 is a diagram that illustrates interaction between a storage device, a client computing device, and a server, wherein a user authenticates to an online service hosted by the server.

With reference now to FIG. 6, a diagram 600 that illustrates interaction between the client computing device 102, the server 104, and the storage device 106 during an authentication phase corresponding to the second construction of the protocol that mitigates dictionary attacks against a password of a user is depicted. In this example, when the user of the client computing device 102 wishes to authenticate to the online service hosted by the server 104, the user initiates a secure communications channel between the client computing device 102 and the server 104, for instance through utilization of a browser. This can also initiate a secure communications channel between the client computing device 102 and the storage device 106.

In the second construction, the receiver component 202 receives an indication that the user wishes to authenticate to the server 104 in the form of a username and password. The transmitter component 204 then transmits the username provided by the user to the server 104. Upon receipt of the username, the challenger component 404 is configured to generate a cryptographically strong challenge and transmit such challenge to the client computing device 102. Prior to receipt of such challenge, or subsequent to receipt of such challenge, or simultaneous with receipt of such challenge, the transform component 208 can generate a hash of the password provided by the user, and can request that the server 104 execute a blind signature on the hash of such password using the bsk. The server 104 does not learn the password or the hash of the password due to the properties of a blind signature scheme. Specifically, the server 104 can include the blind signature component 408 and the client computing device can include the blind signature receiver component 410, which can interact to generate the blind signature on the hash of the password. This results in the client computing device 102 receiving the identity that was generated by the identity generator component 114 during registration, as shown and described with respect to FIG. 5. The server 104 may also be configured to execute the interactive blind signature protocol before, during, or after it sends the challenge to the client computing device 102.

The client computing device 102 may then send the identity to the storage device 106, which utilizes the identity as an index key to look up the ciphertext that was caused to be stored thereon during the registration phase. The storage device 106 can transmit the ciphertext to the client computing device 102. The challenge answerer component 210 can receive such ciphertext and can generate the ssk by decrypting the ciphertext using the hash of the password generated by the transform component 208. The ssk can then be utilized to sign the challenge and therefore generate the signature, and the challenge answerer component 210 can cause the transmitter component 204 to transmit the signature to the challenger component 404 in the server 104. The challenger component 404 may then authenticate the user by verifying the signature in connection with the challenge and the wk.

Figure 7:
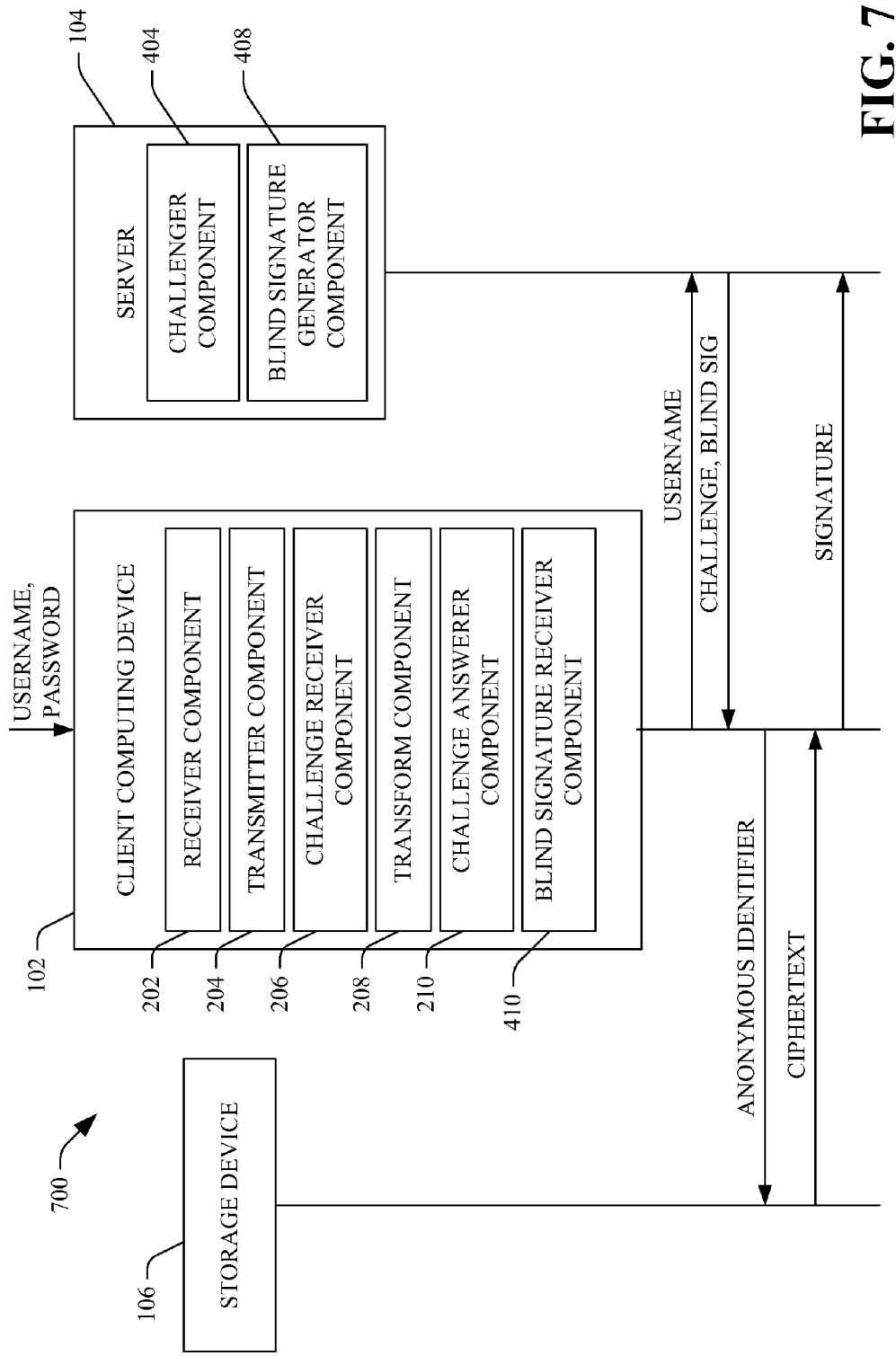
FIG. 7 is a diagram that illustrates interaction between a storage device, a client computing device, and a server, when a user authenticates to an online service hosted by the server.

With reference now to FIG. 7, a diagram 700 that illustrates interaction between the client computing device 102, the server 104, and the storage device 106 during an authentication phase corresponding to the third construction of the protocol that mitigates dictionary attacks against a password of a user is illustrated. The actions of the client computing device 102, the server 104, and the storage device 106 are substantially similar to those described with respect to FIG. 5 during the registration phase. Thus, for the sake of brevity, such actions will not be repeated.

In this example third construction, the user wishes to authenticate to the server, and indicates this by providing the client computing device with a username and the persistent password of the user. Upon receipt of the password, the transform component 208 can generate a cryptographically strong hash of the password. The transmitter component 204 can transmit the username to the server 104. Responsive to receipt of the username, the challenger component 404 can transmit a cryptographically strong challenge to the client computing device 102. Additionally, the client computing device 102 can request that the server 104 utilize a blind signature function to sign the hash of the password generated by the transform component 208. The blind signature component 408 and the blind signature receiver component 410 can interact to generate the blind signature on the hash of the password. This results in the client computing device 102 receiving the identifier.

As described above server 104 may also be configured to execute the interactive blind signature protocol before, during, or after it sends the challenge to the client computing device 102. The challenge receiver component 206 can receive such challenge and can cause a private information retrieval (PIR) protocol to be initiated. This PIR protocol can allow a client computing device 102 to retrieve the ciphertext from the storage device 106 in an anonymous fashion. Thus, an operator of the storage device 106 is unable to learn which online services the user has registered with, and can further be unable to link any two data retrieval requests by the same user. Utilizing the PIR protocol, the client computing device 102 can retrieve the ciphertext from the storage device 106. The challenge answerer component 210 can utilize the hash of the password to decrypt the ciphertext, thus learning the ssk, and can thereafter generate a signature by signing the challenge using the ssk. The transmitter component 204 may then cause the resulting signature to be transmitted to the server 104. The challenger component 404 can receive such signature and verify that the signature corresponds to the username provided by the user.

Figure 8:
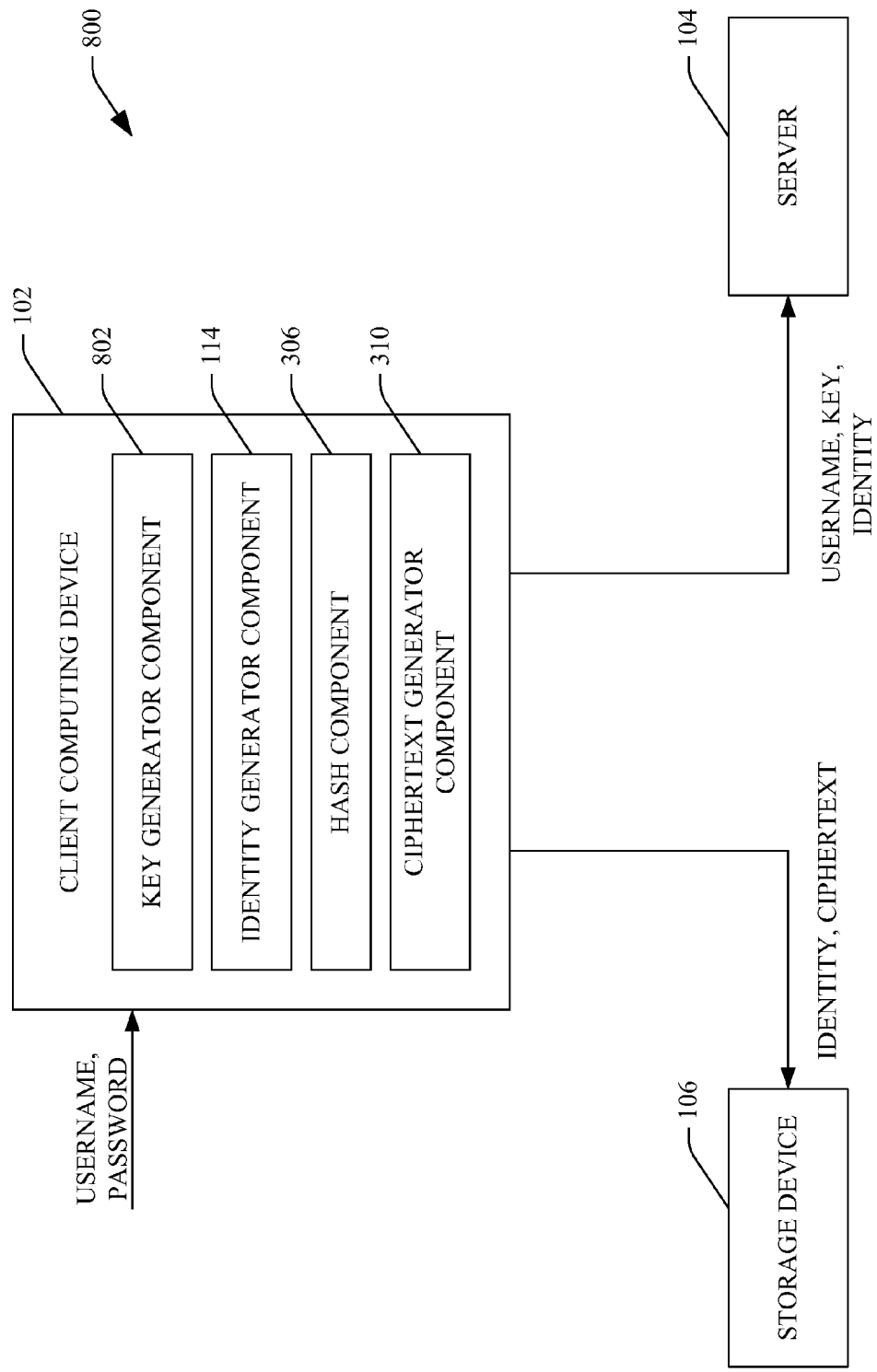
FIG. 8 is a functional block diagram of an example system that facilitates implementing a protocol during registration to an online service in a way that protects a password of a user against a dictionary attack by either the online service or a storage device.
Figure 9:
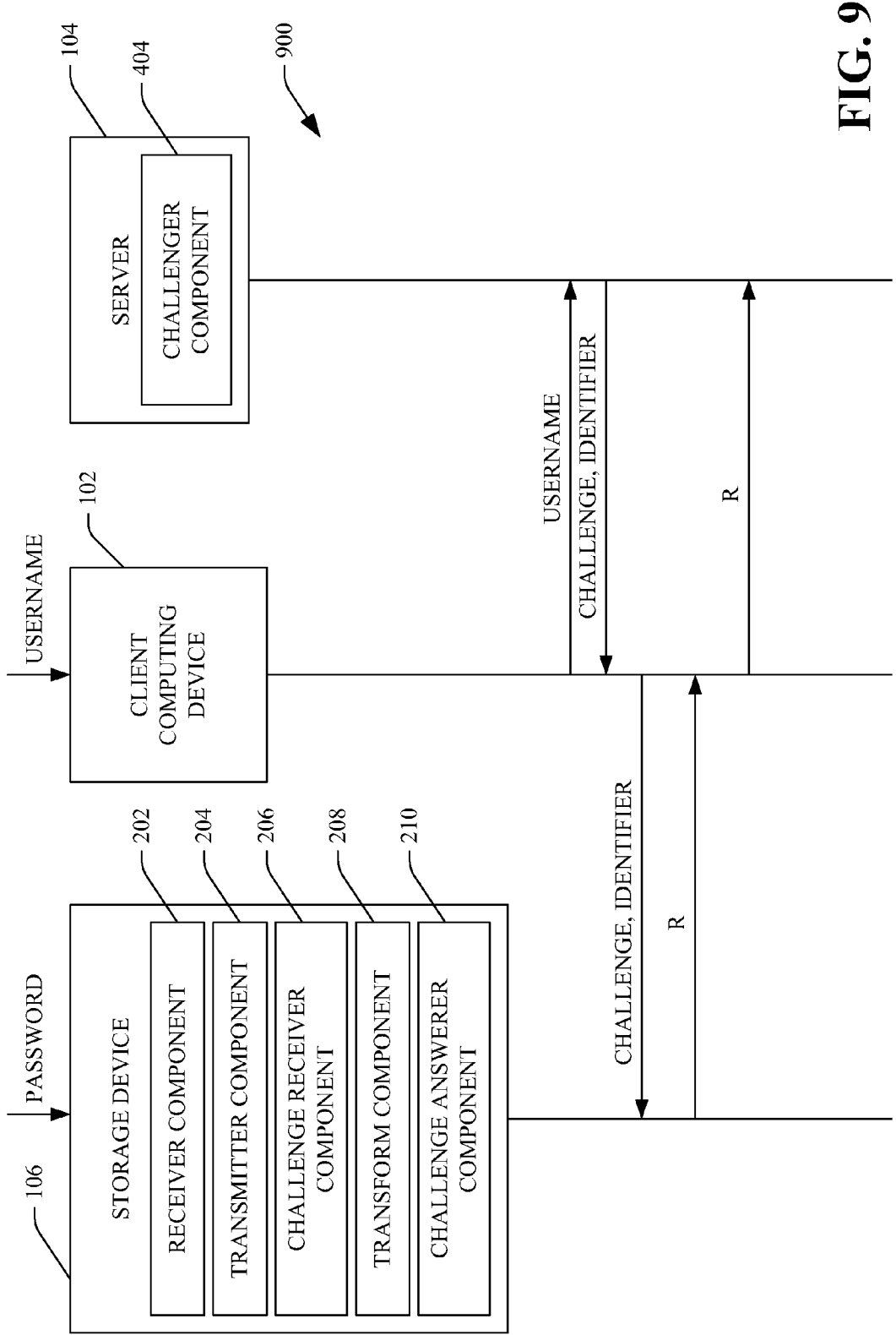
FIG. 9 is a diagram that illustrates interaction between a client computing device, a trusted mobile storage device, and a server providing an online service during authentication of a user to an online service.
Figure 10:
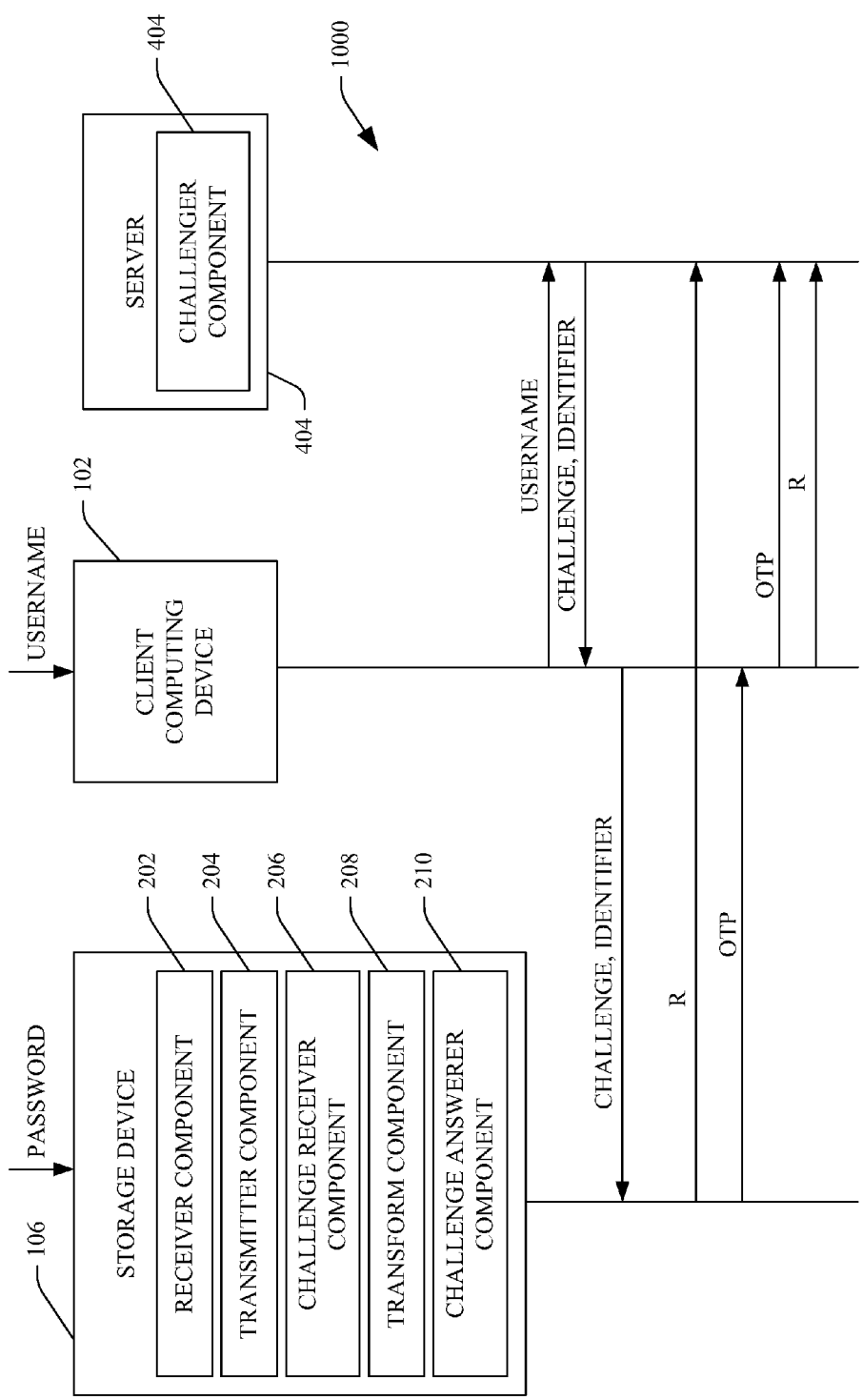
FIG. 10 is a diagram that illustrates interaction between a mobile storage device, a client computing device, and an online service, during authentication of a user employing the client computing device to the online service.

Referring collectively to FIGS. 8-10, registration and authentication phases of the fourth and fifth constructions of the protocol that facilitates mitigating dictionary attacks against a password of a user are illustrated. Specifically, FIG. 8 depicts actions undertaken during user registration with an online service for both constructions, and FIGS. 9 and 10 illustrate actions undertaken by the client computing device 102, the server 104, and the storage device 106 during authentication to the online service by the user in accordance with the fourth and fifth constructions, respectively. In fourth and fifth constructions, the client computing device 102 is trusted during registration but untrusted during authentication. For instance, during registration, the client computing device 102 may be the user's home computer, while, during authentication, the client computing device 102 may be a public computer, such as one that is utilized by the user at an Internet cafe or public library.

Furthermore, in these two constructions the storage device 106 is a trusted storage device, such as a mobile telephone of the user, a portable media player, a personal digital assistant, or other suitable trusted (and possibly portable) computing device. The storage device 106 may be trusted only while it is in possession of the user. If the storage device 106 is lost or stolen, it may go rogue or its internal data may be used by an attacker to try to authenticate to an online service or try to learn the persistent password of the user. Specifically, the attacker may try to use the storage device 106 to launch a dictionary attack and learn the password of the user. In an example embodiment, the trusted storage device can have secure storage capabilities and/or provide some level of authentication to provide access to contents stored thereon.

In the examples provided herein, the storage device 106 may receive information output by the client computing device 102 by way of any suitable method. For instance, the storage device 106 may be coupled to the client computing device 102 by way of a Universal Serial Bus (USB) connection. In another example, the storage device 106 may communicate with the client computing device 102 by way of a Bluetooth connection, a Wi-Fi connection, or other suitable wireless connection. In still yet another example, the storage device 106 may be configured with a microphone and/or a camera, as well as software that allows sounds to be interpreted and/or images to be translated/recognized. For instance, the storage device 106 may include software that allows the contents of images to be translated into text. Accordingly, a client computing device 102 can communicate with the storage device 106 in any suitable manner.

Referring solely to FIG. 8, an example system 800 that facilitates mitigating dictionary attacks on passwords in accordance with a registration phase of the fourth and fifth constructions of the protocol is illustrated. The system 800 includes a client computing device 102, the server 104 that hosts the online service with which the user wishes to register, and a storage device 106, which is a trusted storage device while in the possession of the user. The client computing device 102 receives an indication that the user wishes to register with the server 104—for instance, when the user directs a browser to a web site corresponding to the server 104 and provides such browser with a username and password. The client computing device 102 may comprise a key generator component 802 that, for instance, can generate a Message Authentication Code (MAC) key.

The client computing device 102 may also comprise the identity generator component 114 that can be configured to output a unique identity that identifies the user and/or the service. This identity may be, for instance, a random number, a random combination of numbers and letters, a function of the username and the name of a service to which the user wishes to register, etc. The client computing device 102 may also comprise the hash component 306 which can generate a cryptographically strong hash of the password provided by the user. The ciphertext generator component 310 can encrypt the key generated by the key generator component 802 with the hash of the password generated by the hash component 306 to generate ciphertext. The client computing device 102 may then be configured to transmit the username provided by the user, the key generated by the key generator component 802, and the identity generated by the identity generator component 114 to the server 104.

Additionally, the client computing device 102 can be configured to transmit the identity generated by the identity generator component 114 and the ciphertext output by the ciphertext generator component 310 to the storage device 106. For example, the ciphertext and the identity can be displayed on a computer monitor of the client computing device 102, wherein this can be displayed as a bar code or some other image that a camera in the storage device 106 can recognize In another example, the ciphertext in the identifier can be expressed as audio output that a microphone in the storage device 106 can receive through implementation of a digital or analog based modulation protocol used to form a basic communication channel similar to those used by regular low speed modems. In still yet another example, the display can display the identity and ciphertext, and they can be keyed into the storage device 106 by the user. Of course, the user may also connect the client computing device 102 to the storage device 106 by way of some suitable communications medium such as USB, Wi-Fi, Bluetooth, etc.

In yet another example, a random component or key combination might be entered in the terminal and the storage device (assuming it is provisioned with its own input mechanism). This combination may serve to seed a symmetric encryption protocol used to protect the image and sound as it is transmitted between the client computing device 102 and the storage device 106 through a display screen or speakers. This protocol can provide a basic level of protection against eavesdroppers attempting to capture displayed information, and can be utilized to protect the identity (as it is assumed that the ciphertext is sufficiently robust).

Now referring to FIG. 9, an example diagram 900 that depicts authentication of a user to an online service with respect to the fourth construction is illustrated. The client computing device 102 receives an indication that the user wishes to authenticate to the online service hosted by the server 104. For instance, the user can provide the client computing device 102 only with the username of the user. Thus, the untrusted client computing device 102 does not receive the password of the user. The client computing device 102 can be configured to transmit the username to the server 104. The challenger component 404 on the server 104 can cause a challenge to be transmitted to the client computing device 102 together with the identity received during registration. The client computing device 102 may then be configured to transmit securely the challenge and the identity to the storage device 106.

Additionally, the storage device 106 can receive a password from the user that the user employs to authenticate to the online service. For instance, the user can enter such password by way of a keypad on the storage device 106. In this example, the storage device 106 comprises a receiver component 202, the transmitter component, 204, the challenger receiver component 206, the transform component 208, and the challenge answer component 210. The receiver component 202 can receive the password from the user. The challenge receiver component 206 can receive the challenge from the client computing device 102. The transform component 208 can execute a hash algorithm on the password received by the receiver component 202 to generate a cryptographic hash of such password. Furthermore, the transform component 208 can be configured to use the hash of the password to decrypt the ciphertext generated during authentication to learn the MAC key.

The challenge answerer component 210 may then sign the challenge using the MAC key to generate a signature. Optionally, the challenge answerer component 210 can also be configured to trim the signature (or run some other deterministic function on the signature). For instance, the challenge answerer component 210 can be configured to cause the first 40 bits of the signature to be displayed as human-readable characters on a display screen of the storage device 106. This trimmed signature (R) may then be provided to the server 104 by way of the client computing device 102. (The user can input R into a field in the browser to cause such signature to be transmitted to the server). The challenger component 404 may then utilize the MAC key provided to the server 104 during registration to verify the (possibly abbreviated) signature. After the server 104 has authenticated the user, the storage device 106 can forget the password provided by the user.

Turning now to FIG. 10, an example diagram 1000 that illustrates authenticating to an online service in accordance with the fifth construction of a protocol that mitigates dictionary attacks against passwords is illustrated. As described above, registration with respect to this fifth construction can be substantially similar to that which has been described with respect to the fourth construction as shown in FIG. 8. In the fifth construction, during registration, however, the client computing device 102 can be configured to generate either a MAC key or a regular signature key pair, wherein the storage device 106 is provided with an encryption of the signing key while the server 104 is provided with the verification key.

In the example fifth construction, the storage device 106 comprises the receiver component 202, the transmitter component 204, the challenge receiver component 206, the transform component 208, and the challenge answerer component 210. When the user wishes to authenticate to the online service hosted by the server 104, the user provides a username to such server 104 by way of any suitable secure connection. The username can be provided via the client computing device 102, for instance. The username is received by the challenger component 404, which looks up the identity corresponding to the username and outputs a cryptographically strong/random challenge and the identity. The client computing device 102 is then configured to provide the challenge and the identity to the storage device 106 by way of any suitable (secure) method.

Additionally, the user provides the storage device 106 with the persistent password of the user, which is received by the receiver component 202. The challenge receiver component 206 receives the challenge generated by the challenger component 404. The transform component 208 receives the password and generates the hash of such password. The transform component 208 can be configured to decrypt the ciphertext, utilizing the hash of the password, to learn the appropriate key (MAC key or signature key). The challenge answerer component 210 can sign the challenge using the MAC or signature key. Furthermore, the challenge answerer component 210 can be configured to generate a short, one-time password (OTP) and can encrypt the signature using the hash of the OTP as the encryption key. The storage device 106 may then be configured to transmit the encryption of the signature directly to the server 104. Optionally, the storage device 106 may also transmit the identity back to the server 104, so that the server knows that the encryption of the signature corresponds to the identity/user. The encryption of the signature and the identity can be transmitted via any suitable connection, even an unsecure connection such as HTTP or SMS.

The storage device 106 can then be configured to display or audibly output the OTP, and the user can utilize the client computing device 102 to transmit the OTP to the server 104. The challenger component 404 can then utilize the OTP to decrypt the ciphertext and learn the signature, and can use the MAC key or signature verification key to verify the signature. After the user has utilized the OTP and the server 104 has received the encryption of the signature (and optionally the identity), the storage device 106 can forget the persistent password of such user.

Figure 11:
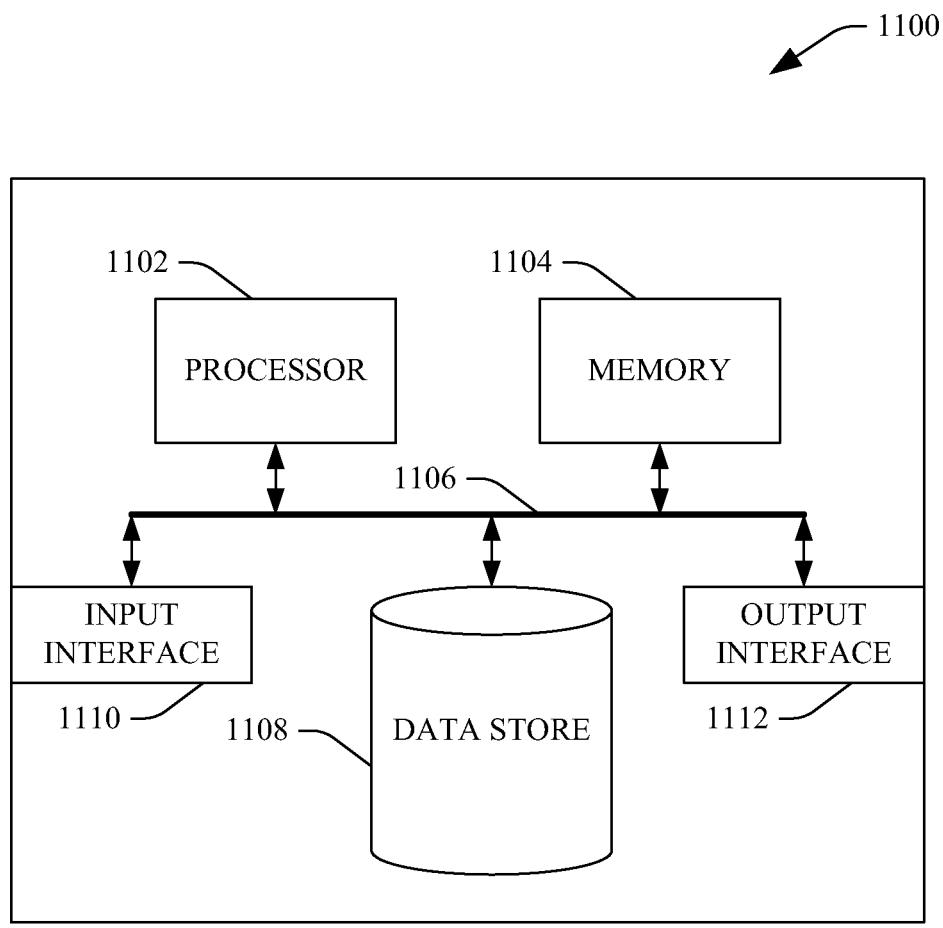
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports registering a user in such a manner that the password of the user is not subject to dictionary attacks. In another example, at least a portion of the computing device 1100 may be used in a system that supports authenticating a user in such a way that the password of a user is not subject to dictionary attacks. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store signature keys, blind signature keys, encrypted data, ciphertext, etc.

The computing device 1100 additionally includes a data store 1108 that is accessible by the processor 1102 by way of the system bus 1106. The data store 1108 may be or include any suitable computer-readable storage, including a hard disk, memory, etc. The data store 1108 may include executable instructions, identifiers, signature keys, blind signature keys, etc. The computing device 1100 also includes an input interface 1110 that allows external devices to communicate with the computing device 1100. For instance, the input interface 1110 may be used to receive instructions from an external computer device, from a storage provider, directly from a user, etc. The computing device 1100 also includes an output interface 1112 that interfaces the computing device 1100 with one or more external devices or the user. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates protecting a password from dictionary attacks, the method comprising the following computer-executable acts:
    authenticating a user to an online service, wherein authenticating comprises:
        at a client computing device, receiving a username and persistent password from the user that wishes to authenticate to the online service, the online service hosted by a server that is accessible to the client computing device by way of a network connection;
        transmitting the username from the client computing device to the server;
        responsive to transmitting the username, receiving at the client computing device from the server a challenge to authenticate the user;
        receiving, from a storage device, first data that is processible by the client computing device to reply to the challenge from the server, the storage device separate from both the client computing device and the server;
        processing the first data to obtain a signature, wherein the persistent password is unidentifiable from the signature; and
        transmitting the signature to the server responsive to receipt of the challenge,
    wherein the client computing device fails to transmit the persistent password or a deterministic function of the persistent password to either the server or the storage device when authenticating the user to the online service.

2. The method of claim 1, wherein the client computing device is one of a mobile telephone or a portable media player.

3. The method of claim 1, wherein the storage device is a mobile telephone.

4. The method of claim 1, further comprising:
    registering the user with the online service, comprising:
        executing a blind signature key generation algorithm to generate a blind signature key pair, wherein the blind signature key pair comprises a randomly generated blind signature key;
        executing a digital signature key generation algorithm to generate a signature key pair, wherein the signature key pair comprises a randomly generated signature verification key and a randomly generated signing key;
        executing a first hashing algorithm to generate a cryptographic hash of the persistent password;
        executing a blind signature on the cryptographic hash of the persistent password using the blind signature key to generate a first blind signature;
        hashing the first blind signature to generate a first key;
        executing an encryption algorithm to encrypt the signing key utilizing the first key to generate ciphertext;
        generating an identity that identifies the user, wherein the identity is based at least in part upon the username;
        transmitting the identity, the ciphertext, and the blind signature key to the storage device; and
        transmitting the username and the signature verification key to the server.

5. The method of claim 4, wherein authenticating the user to the online service further comprises:
    generating the identity responsive to receiving the username and persistent password from the user;
    re-executing the first hashing function to regenerate the cryptographic hash of the persistent password;
    transmitting the identity to the storage device to cause the storage device to retrieve the blind signature key and the ciphertext that are indexed by the identity, and further causing the storage device to execute a blind signature algorithm to apply a blind signature to the cryptographic hash of the persistent password using the blind signature key;
    receiving the blind signature and the ciphertext from the storage device;
    executing a hashing algorithm on the blind signature to regenerate the first key; and executing a decryption algorithm of the ciphertext utilizing the cryptographic key to generate the signing key.

6. The method of claim 1, further comprising:
registering the user with the online service, comprising:
executing a blind signature key generation algorithm to generate a blind signature key pair, wherein the blind signature key pair comprises a randomly generated blind signature key;
executing a signature key generation algorithm to generate a signature key pair, wherein the signature key pair comprises a signature verification key and a signing key;
executing a first hashing algorithm to generate a cryptographic hash of the persistent password;
executing a blind signature on the cryptographic hash of the persistent password using the blind signature key to generate an identity;
executing an encryption algorithm to encrypt the signing key utilizing the cryptographic hash of the persistent password to generate ciphertext, wherein the first data comprises the ciphertext;
transmitting the identity and the ciphertext to the storage device; and
transmitting the username, the signature verification key, and the blind signature key and to the server.

7. The method of claim 6, wherein authenticating the user to the online service further comprises:
re-executing the first hashing function to regenerate the cryptographic hash of the persistent password;
causing the server to generate a blind signature for the cryptographic hash of the persistent password utilizing the blind signature key;
receiving the blind signature from the server;
executing a cryptographic hashing algorithm on the blind signature to generate the identity;
transmitting the identity to the storage device to cause the storage device to retrieve the ciphertext that is indexed by the identity;
receiving the ciphertext from storage device;
executing a decryption algorithm on the ciphertext utilizing the cryptographic hash of the persistent password to generate the signing key; and
signing the challenge provided by the server utilizing the signing key to generate the signature.

8. The method of claim 6, wherein authenticating the user to the online service further comprises:
re-executing the first hashing function to regenerate the cryptographic hash of the persistent password;
causing the server to generate a blind signature for the cryptographic hash of the persistent password utilizing the blind signature key;
receiving the blind signature from the server;
computing a cryptographic hash on the blind signature to generate the identity;
transmitting the identity to the storage device to cause the storage device to retrieve the ciphertext that is indexed by the identity, wherein a Private Information Retrieval protocol is utilized to locate the ciphertext;
receiving the ciphertext from storage device;
executing a decryption algorithm on the ciphertext utilizing a cryptographic hash of the persistent password to generate the signing key; and
signing the challenge provided by the server utilizing the signing key to generate the signature.

9. The method of claim 1, further comprising:
registering the user with the online service, comprising:
executing a signature key generation algorithm to generate a signing key;
generating an identity;
executing a first hashing algorithm to generate a cryptographic hash of the persistent password;
executing an encryption algorithm to encrypt the signing key utilizing the cryptographic hash of the persistent password to generate ciphertext;
transmitting the identifier and the ciphertext to the storage device, wherein the storage device is a local storage device; and
transmitting the username, the signing key, and the identifier to the server.

10. The method of claim 1 configured for execution in an Internet browser executing on the client computing device.

11. The method of claim 1, wherein the storage device is a mobile computing device that is configured with cryptographic algorithms.

12. A client computing device that facilitates executing a protocol, the protocol configured to secure a user password from dictionary attacks, the system comprising:
a processor; and
a memory that comprises a plurality of components that are executed by the processor, the plurality of components comprising:
a receiver component that is configured to receive an indication that a user wishes to authenticate with an online service hosted by a server, wherein the indication comprises a username and persistent password of the user;
a transmitter component that, responsive to the receiver component receiving the indication, is configured to transmit the username to the server while refraining from transmitting the persistent password to the server;
a challenge receiver component that is configured to receive a challenge from the server responsive to the transmitter component transmitting the username to the server, wherein the challenge requests a signature from the client computing device;
a transform component that, responsive to the challenge receiver component receiving the challenge, is configured to execute a first cryptographic function on the persistent password to retrieve a data packet from a storage device responsive to receipt of the challenge; and
a challenge answerer component that is configured to execute a second cryptographic function on the data packet to generate a signature,
wherein the transmitter component is configured to transmit the signature to the server responsive to the challenge answerer component generating the signature.

13. The client computing device of claim 12, wherein the first cryptographic algorithm is a cryptographic hash function.

14. The client computing device of claim 12, wherein the storage device is a mobile telephone.

15. The client computing device of claim 12, wherein the storage device is accessible by way of the Internet.

16. The client computing device of claim 12, the plurality of components further comprising an identity generator component that generates an identity that identifies the user and the online service, wherein the data packet is retrieved from the storage device through utilization of the identity.

17. The client computing device of claim 12, the plurality of components further comprising a blind signature generator component that is configured to generate a blind signature key pair during a registration phase, wherein the blind signature key pair comprises a blind signature key and a blind verification key, and wherein the challenge answerer component is configured to execute the second cryptographic function through utilization of at least one of the blind signature key or the blind verification key.

18. The system of claim 12, wherein the challenge answerer component is configured to receive a cryptographic key, ciphertext, and a blind signature of a hash of the persistent password, and is further configured to utilize the hash of the persistent password to decrypt the ciphertext and retrieve a signing key to answer the challenge.

19. A computer-readable data storage device resident upon a mobile computing device comprising instructions that, when executed by a processor, cause the processor to perform acts comprising:

receiving a challenge from a server computing device that hosts an online service with which a user wishes to authenticate, wherein the challenge is issued by the server computing device responsive to the server computing device receiving a username corresponding to the user;

receiving a persistent password for the username, wherein the mobile computing device refrains from transmitting either the persistent password or a deterministic function of the persistent password to the server computing device;

executing a hash algorithm on the persistent password to generate a cryptographic hash of the persistent password;

decrypting ciphertext utilizing the cryptographic hash of the persistent password to generate a key, wherein the key is a randomly or pseudo-randomly generated key that is generated during a registration phase with the online service and the ciphertext is an encryption of the key utilizing the cryptographic hash of the persistent password;

signing the challenge using the key to generate a signature; and responding to the challenge based at least in part upon the signature.

20. The computer-readable data storage device of claim 19, the acts further comprising:

responsive to generating the cryptographic hash of the persistent password, receiving the ciphertext from a storage device that is external to the mobile computing device and the server.

* * * * *